(No Model.)
H. MENDENHALL.
FEED TROUGH.
No. 339,915. Patented Apr. 13, 1886.
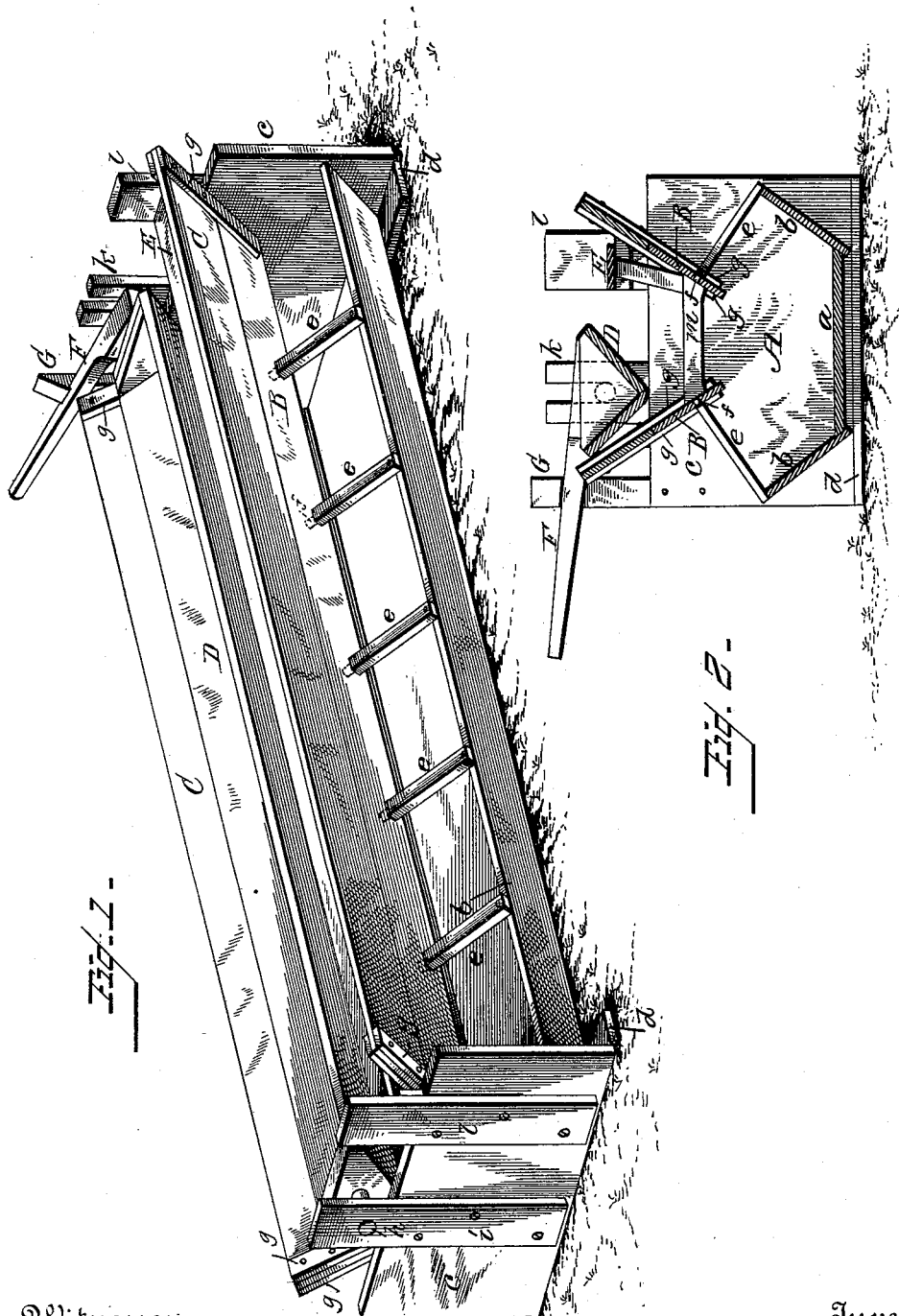
Witnesses
Inventor
Hiram Mendenhall.
By his Attorney Chas. H. Fowler

UNITED STATES PATENT OFFICE.

HIRAM MENDENHALL, OF AUDUBON, IOWA.

FEED-TROUGH.

SPECIFICATION forming part of Letters Patent No. 339,915, dated April 13, 1886.

Application filed January 19, 1886. Serial No. 189,066. (No model.)

*To all whom it may concern:*

Be it known that I, HIRAM MENDENHALL, a citizen of the United States, residing at Audubon, in the county of Audubon and State of Iowa, have invented certain new and useful Improvements in Feed-Troughs; and I do hereby declare that the following is a full, clear, and exact description of the same, reference being had to the annexed drawings, making a part of this specification, and to the letters and figures of reference marked thereon.

Figure 1 of the drawings is a perspective view of my invention, and Fig. 2 a cross-section thereof.

The present invention has for its object to provide a feeding-trough for hogs; and it consists in the details of construction, substantially as shown in the drawings and hereinafter described and claimed.

In the accompanying drawings, A represents the feeding-trough, which consists of the bottom $a$ and angular sides $b$, connected thereto in any desired manner and to the end sections, $c$, the same being provided with inwardly-projecting supports $d$, upon which the bottom and sides of the trough rest. The trough is provided with the usual transverse bars, $e$, which are connected to the sides of said trough and to outwardly-inclined guard-boards B, thereby compelling each hog to feed between the transverse bars, and the guard-board preventing the hogs from getting their feet in the trough. The bars $e$ are connected to the boards B by pins $f$, formed on the end of the bars, which enter holes in the boards, thus admitting of the latter being removed for cleaning the trough, the fastenings which connect the ends of said boards to the sections $c$ being first removed. The guard-boards B are provided with detachable extensions C, having at their ends cleats $g$, to fit over the boards or straddle them, to prevent the hogs from climbing over the trough.

Above the trough A is a pivoted supply-hopper, D, in which the swill or other feed is placed preparatory to supplying the trough, a foot-walk, E, being provided, so that an equal quantity of feed can be placed in the hopper throughout its length, and when dumped the trough will be equally supplied with feed between each of the bars $e$, thereby insuring each hog getting its share. The hopper has pins or pivots $h$ at its ends, one of said pivots having its bearing in the support $i$, and the opposite pivot resting in the slotted end of a similar support, $k$, thus enabling the hopper to be removed for cleaning.

The supports above described are secured to the end sections, $c$, upon the outer side thereof, which, in connection with the strips $l$, prevent the hogs from climbing over the ends of the trough.

The hopper D at one end is provided with a suitable handle, F, for tipping it, in distributing the feed, and is held in a horizontal position while being filled by a keeper, G, with which the handle engages.

The guard-boards B may be strengthened by a detachable connecting-brace, $m$, which is removed when the boards are to be detached.

Having now fully described my invention, what I claim as new, and desire to secure by Letters Patent, is—

1. In a feeding-trough, the combination, with a pivoted hopper located above the same and to supply the feed thereto, of a foot-board connected to the trough, said board and hopper extending the entire length thereof, substantially as and for the purpose specified.

2. A feeding-trough consisting of end sections having inwardly-projecting supports, the bottom and sides of the trough resting thereon, removable guard-boards provided with detachable extensions, and transverse bars connected to the boards and to the sides of the trough, substantially as and for the purpose set forth.

3. A feeding-trough provided with detachable or removable guard-boards and extensions thereto, also removable, and a pivoted supply-hopper supported above the trough and detachable therefrom, substantially as and for the purpose described.

In testimony that I claim the above I have hereunto subscribed my name in the presence of two witnesses.

HIRAM MENDENHALL.

Witnesses:
A. F. ARMSTRONG,
THEO. F. MORROW.